Sept. 22, 1964 D. E. HORNING ETAL 3,149,765

APPARATUS FOR REMOVING WAFERS FROM SEMICONDUCTOR SLICES

Filed May 28, 1963 9 Sheets-Sheet 1

INVENTORS
D. E. HORNING
H. K. NAUMANN
G. G. SEAMAN
By W. A. Johnson
ATTORNEY

Sept. 22, 1964 D. E. HORNING ETAL 3,149,765

APPARATUS FOR REMOVING WAFERS FROM SEMICONDUCTOR SLICES

Filed May 28, 1963 9 Sheets-Sheet 2

APPARATUS FOR REMOVING WAFERS FROM SEMICONDUCTOR SLICES

Filed May 28, 1963 9 Sheets-Sheet 3

APPARATUS FOR REMOVING WAFERS FROM SEMICONDUCTOR SLICES

APPARATUS FOR REMOVING WAFERS FROM SEMICONDUCTOR SLICES

Sept. 22, 1964 D. E. HORNING ETAL 3,149,765

APPARATUS FOR REMOVING WAFERS FROM SEMICONDUCTOR SLICES

Filed May 28, 1963

APPARATUS FOR REMOVING WAFERS FROM SEMICONDUCTOR SLICES

Filed May 28, 1963

Sept. 22, 1964 D. E. HORNING ETAL 3,149,765

APPARATUS FOR REMOVING WAFERS FROM SEMICONDUCTOR SLICES

Filed May 28, 1963 9 Sheets-Sheet 9

United States Patent Office 3,149,765 Patented Sept. 22, 1964

3,149,765

APPARATUS FOR REMOVING WAFERS FROM SEMICONDUCTOR SLICES

Donald E. Horning, Wyomissing, and Harry K. Naumann, Wernersville, Pa., and Gary G. Seaman, Millard, Nebr., assignors to Western Electric Company, Incorporated, New York, N.Y., a corporation of New York Filed May 28, 1963, Ser. No. 283,889
9 Claims. (Cl. 225—97)

This invention relates to apparatus for removing wafers from semiconductor slices, such as silicon and germanium slices.

Semiconductor wafers employed in the manufacture of electrical components, are as a rule, cut from slices of predetermined thicknesses. The sizes of the wafers make them difficult to process. In the present instance, the wafers are .0200" x .0200" and .0030" to .0040" thick. Furthermore, the slices are scribed to produce thirty-five strips with twenty-two wafers in each strip.

The object of the present invention is an apparatus for efficiently and accurately removing wafers from scribed semiconductor slices.

In accordance with the object, the invention includes a unit operable to break strips of scribed wafers successively from a scribed semiconductor slice and a unit operable to break the wafers successively from the strips. More specifically, the apparatus receives successive slices of semiconductor material, feeds the slices to the strip breaking unit at predetermined intervals, advances the successive strips a measured distance to a wafer breaking unit after which the individual wafers are screened, the undesirable wafers being rejected and the desirable wafers being deposited in nests of a wafer tray.

Other objects and advantages will be apparent from the following detailed description when considered in conjunction with the accompanying drawings wherein.

Figure 3:
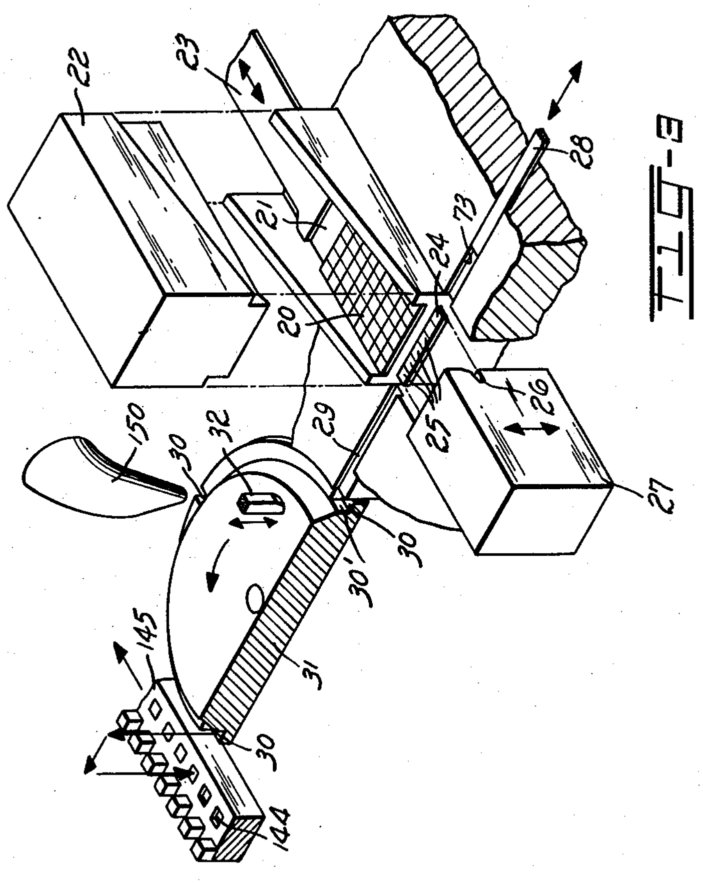
FIG. 3 is a schematic illustration of portions of the apparatus.

A general understanding of the function of the apparatus may be derived from FIG. 3, which illustrates a scribed slice 20 of semiconductor material placed in a nest 21, which is closed by a weighted member 22 when placed over the slice 20 and a feeding element 23 in the nest. In this illustration, the slice is illustrated as being scribed for only ten strips 24 and six wafers 25 in each strip. It should be understood, however, that this is for the purpose of illustration only and that in actual structure, in the present instance, *the slice is scribed to produce* thirty-five strips 24 with twenty-two wafers in each strip. The feeding element 23 is actuated at predetermined intervals to move leading portions of the slice 20 into a mouth 26 of a unit 27 operable to break the strips 24 successively from the slice 20. A pusher 28, although shown spaced from the end of the broken strip 25, is positioned in close proximity to the trailing end of the strip so that through the operation of feeding means the pusher 28 may be moved measured distances to move successive strips through the mouth 26 of the unit 27 and a guideway 29 to locate the wafers successively in three-sided pockets 30 in a turret 31. A fourth side is provided for the pockets in all positions by a surface 30' of an opening in a plate 31'. A wafer breaking unit 32 is operated at the end of each advancing movement of the pusher 28 to break a wafer from a strip and deposit it in one of the pockets 30 of the turret 31 located at the receiving wafer breaking position.

Figure 1:
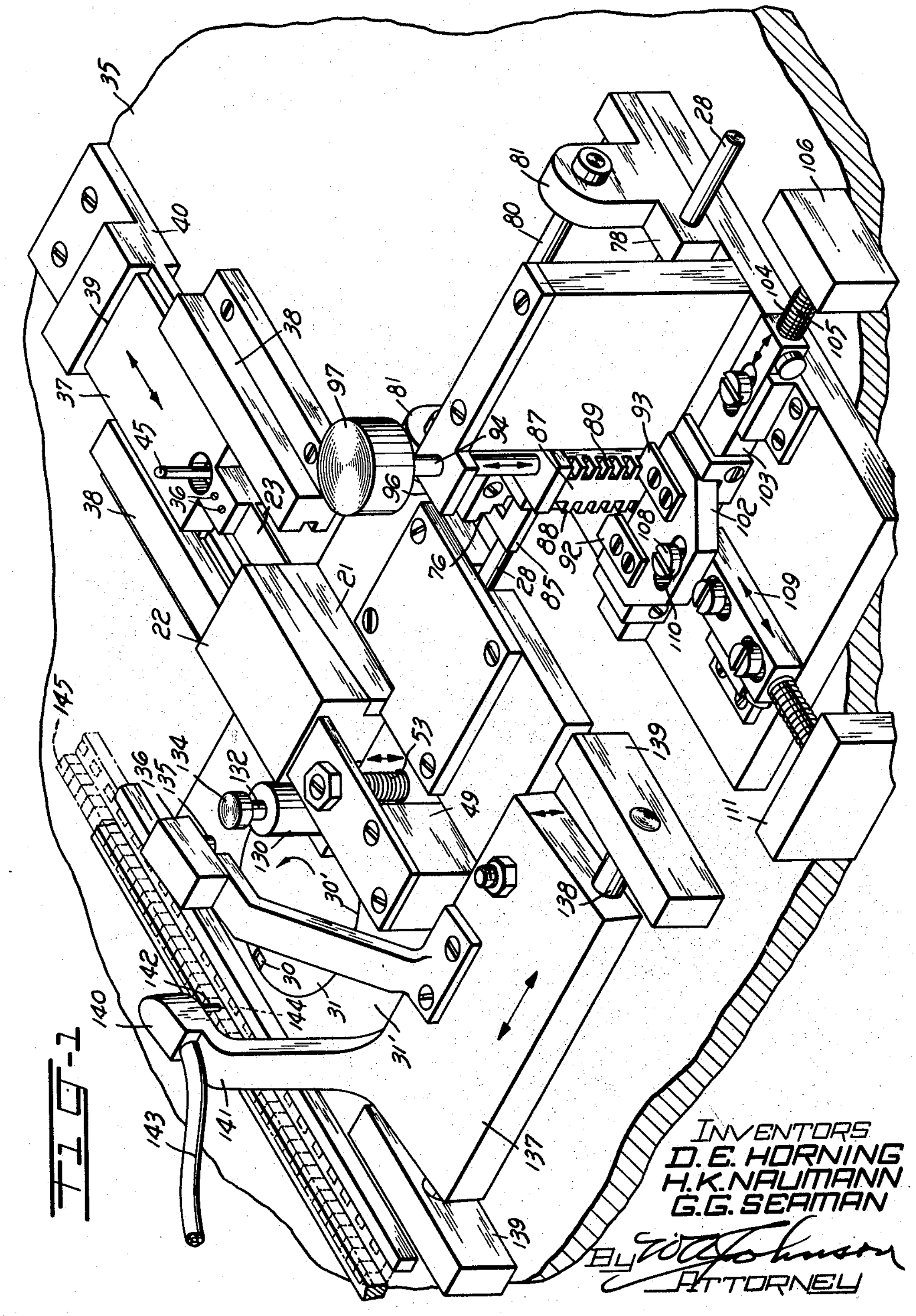
FIG. 1 is an isometric view of the apparatus.
Figure 2:
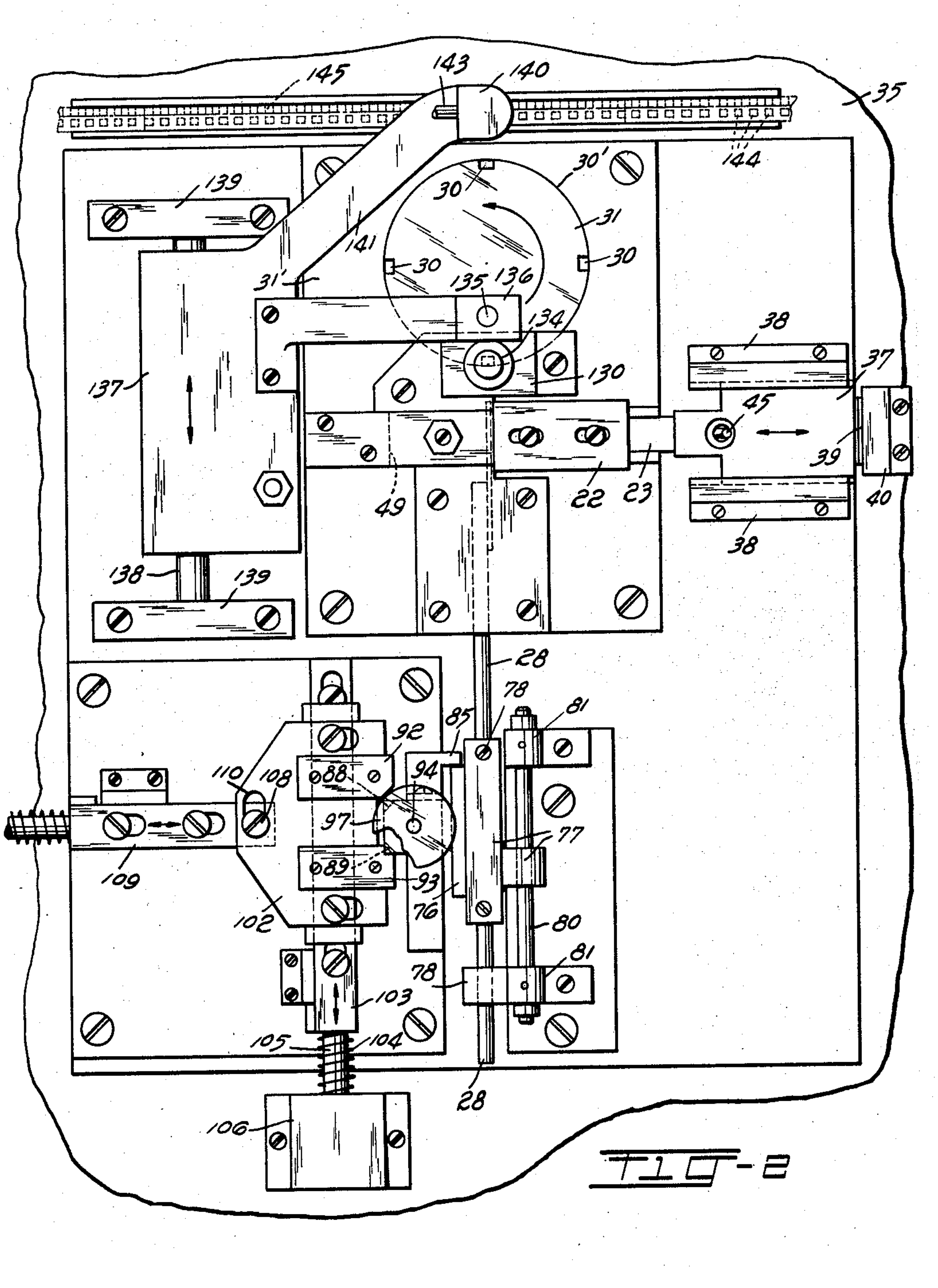
FIG. 2 is a top plan view of the apparatus.

By viewing FIGS. 1 and 2, it will be apparent that the features defined in FIG. 3 are supported mainly by a base 35. The nest 21 is mounted on the base 35 and the element 23 has its outer end fixed at 36 to a slide 37 supported by guides 38 mounted on the base 35. A trailing end 39 of the slide 37 is held at the starting position shown in FIG. 1 during loading of a slice 20 in the nest 21 by a permanent magnet 40 mounted on the base 35.

The element 23 moves the slice 20 in the nest 21 by gravity through the aid of a lever 42 (FIG. 4) pivotally supported at 43 and carrying a weight 44 on its lower arm normally urging the lever counter-clockwise to cause a reduced portion 45 of its upper arm to move the slide 37 to the left. A double V-shaped aperture 46, in the slide 37, permits rocking movement of the portion 45 therein as the slide 37 with the element 23 is moved to feed the slice to the breaking unit 27. The breaking unit 27 is disposed for vertical movement in an aperture 48 of a member 49 and is supported by a rod 50 extending downwardly through a threaded sleeve 51 serving as an adjustable stop through the aid of a nut 52 to limit the downward movement of the strip breaking unit 27. The unit is urged downwardly by a spring 53 and is under the control of a cam 54 and cam levers 55. The cam levers 55 have adjacent ends fixed to a spindle 57 rotatably supported at 58, the lever 55 having a roller 59 riding upon the cam 54 while the lever 56 has a roller 60 engaging a spring cushioning plunger 61 connecting the lower end of the rod 50 to the cam control means. The strip breaking unit 27, as shown in FIGS. 5 to 8 inclusive, is provided with a mouth 65 extending the full width thereof and provided with an inner surface 66 serving as a stop for the leading end of the slice 20 to locate the scribed line 67 of the slice 20 in a plane with an exit or breaking edge 68 of the nest 21. The mouth 65 has a surface 69 to support the leading strip 24 and a diagonal surface 70 extending from the surface 66 and cooperating therewith in breaking the leading strip from the slice during downward movement of the unit 27. Another diagonal surface 71, of the mouth 65, serves to engage the new leading end of the slice 20 and hold it against forward movement while the unit 27 remains in the position shown in FIG. 8 during feeding of the strip by the pusher 28 shown in FIGS. 1, 2, 3, 10, 11 and 12.

The pusher 28 is a part of the strip feeding means and is movable in a suitable guide 73 to move the strip through the mouth 65 of the unit 27 and through guideway 29, FIG. 3, to the wafer breaking unit 32. An end 74 of the pusher 28 opposite the strip engaging end 75 is adustably connected to a measuring element 76. Actually, the portion of the pusher 28, in the area of the element 76, FIG. 2, is in the form of a rod extending through an aperture in a carriage 77, to which the element is fixed, and adjustably connected thereto by a set screw 78. The carriage 77 is positioned to ride upon a bar 80, supported at its ends by brackets 81. The bracket 81 has a bearing member 82 to assist in supporting the pusher 28 and cause the pusher and the bar 80 to assist in supporting the measuring element 76.

Figure 10:
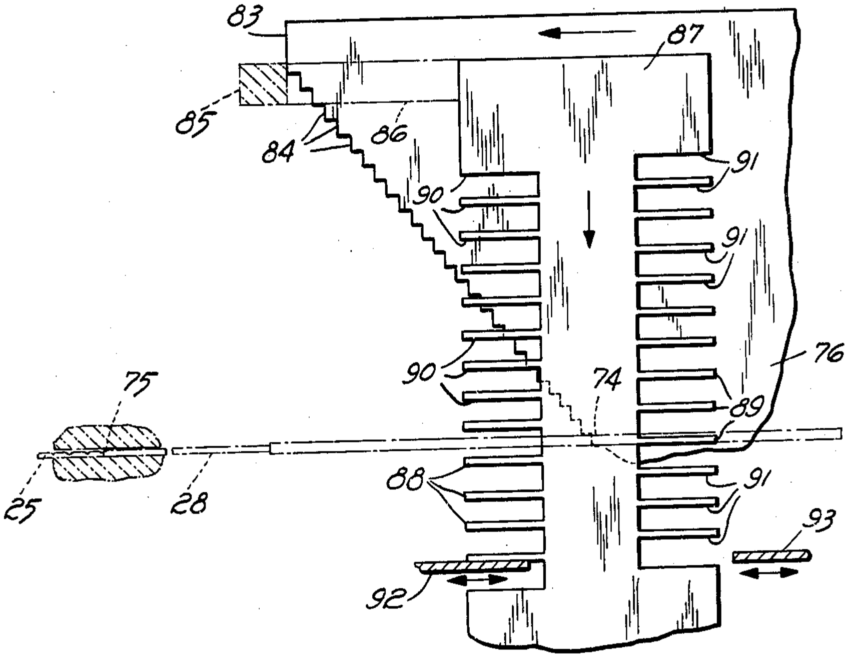
FIG. 10 is a fragmentary detailed view of a portion of the strip feeding means.

The measuring element 76, FIG. 10, has a zero surface 83 and due to the fact that in the present instance there are twenty-two wafers in each strip, the element 76 is provided with twenty-five measuring steps 84 of like depths and like heights functioning with respect to a movable stop or locator 85. With means to move the stop 85 intermittently from the zero surface 83, in a direct vertical path downwardly for successive engagement with the steps 84, a continuous moving force applied to the measuring element 76 will cause intermittent advancement of the pusher 28 measured distances to feed the strip 25 to successively locate the wafers thereof beneath the wafer breaking unit 32. For this reason, the depth of the steps is equal to the length of the wafers.

Figure 11:
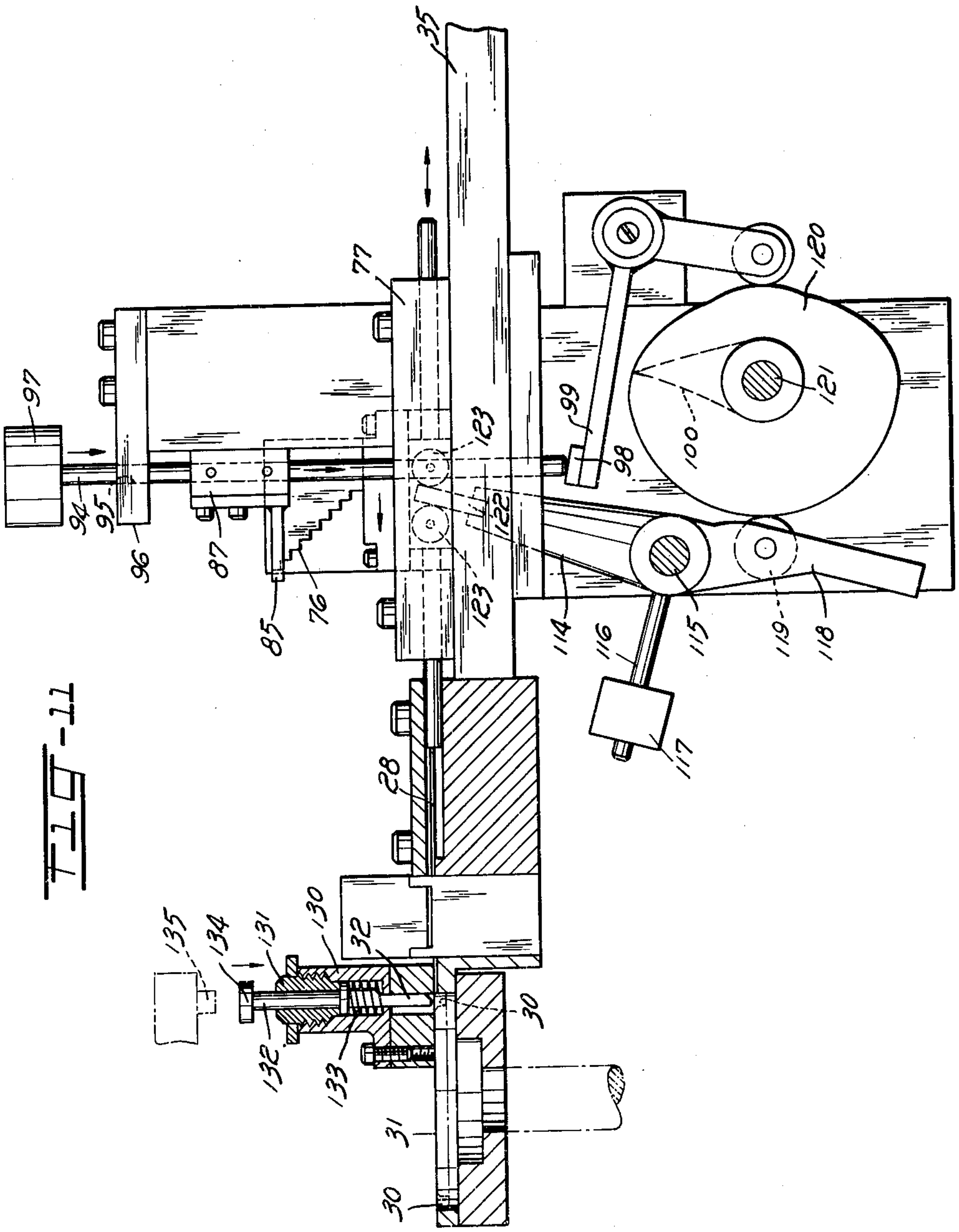
FIG. 11 is a vertical sectional view of a portion of the apparatus illustrating the strip feeding means and the wafer breaking means.

The stop 85 has a portion 86 extending to the right, FIG. 10, and fixed to a positioning unit 87. The positioning unit has two series of projections 88 and 89 with under surfaces 90 and 91 which are to function with respect to actuators 92 and 93 to allow the positioning unit to move downwardly by gravity successive like distances equalling substantially the height of each step 84 of the measuring element 76. To assist in this downward movement, the actuator 87 has a rod 94 extending upwardly therefrom through an aperture 95 in a guide 96, the upper end of the rod being provided with a weight 97. In FIG. 11 the rod 94 is shown extending downwardly through the base 35 and positioned to engage a portion 98 of a cam lever 99, which through the aid of a cam 100 may return the rod 94 and the positioning unit to their up or starting positions.

The actuators 92 and 93 are shown in FIGS. 1 and 2 as being mounted on a carriage 102 adjustably mounted on a slide 103, which is urged in one direction by a spring 104 to move the actuator 93 into supporting position and the actuator 92 out of position. The spring 104 is disposed concentric with a core 105 of a solenoid 106 which may the energized intermittently to reverse the action of the carriage 102 to move the actuator 92 into supporting position and the actuator 93 out of supporting position. The actuators 92 and 93 are spaced so that one may be moved into a supporting position before the other is moved completely out of supporting position to allow the positioning unit 87 to drop the like distances successively. The solenoid 106 may be operated during the predetermined intervals by suitable means not shown. The carriage 102 is connected at 108 to another slide 109, this connection being made through an elongated aperture 110 of the carriage so as not to interfere with the operation of the carriage through the spring 104 and the solenoid 106 but so that at the end of one series of operations for each strip, that is, when the last wafer of the strip has been moved by the pusher 28 into alignment with the wafer breaking unit 32, means may be operated to lead the measuring element 76 and the positioning unit 87 to their starting position. First, however, a solenoid 111 is energized to move its slide 109 to move the carriage 102 to free the actuators 92 and 93 from the projections 88 and 89 to allow means (not shown) to rock the cam lever 99 clockwise leading the positioning unit 87 to its up position shown in FIG. 10.

The means applying a constant force to the measuring unit 76 to advance it a measured distance when released by the stop 85 includes a lever 114 pivoted at 115 and carrying an arm 116 with a weight 117. The lever 114 is provided with an extension 118 carrying a cam roller 119, which will be engaged by a cam 120 on a cam shaft 121 with the cam 100 to move the lever 114 and the measuring element to their starting positions. During the feeding action or the forward movement of the measuring element 76, an upper portion 122 of the lever 114 rides between the rollers 123 supported in a hollow portion of the carriage 77 to transmit the force established by the weight 117 through the carriage 77 to the measuring element 76 to move the pusher 28 forwardly.

Figure 9:
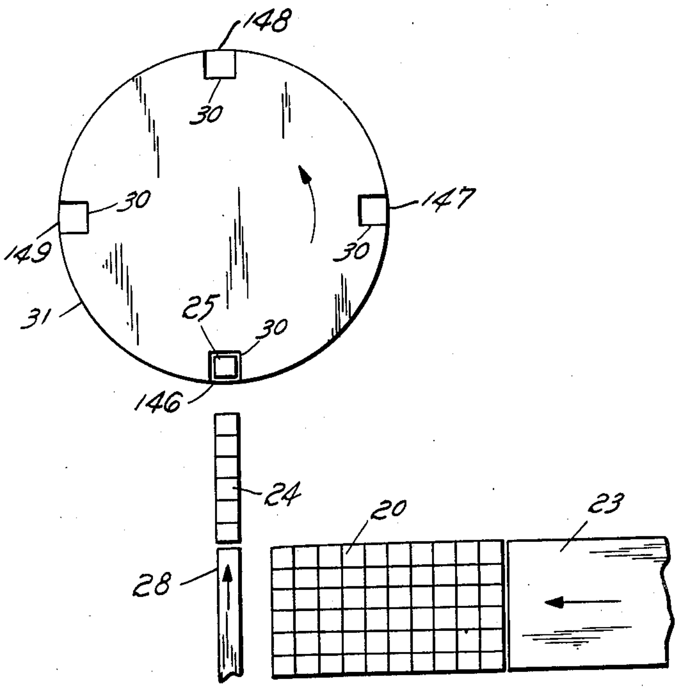
FIG. 9 is a top plan schematic illustration of the results of the function of the apparatus.
Figure 12:
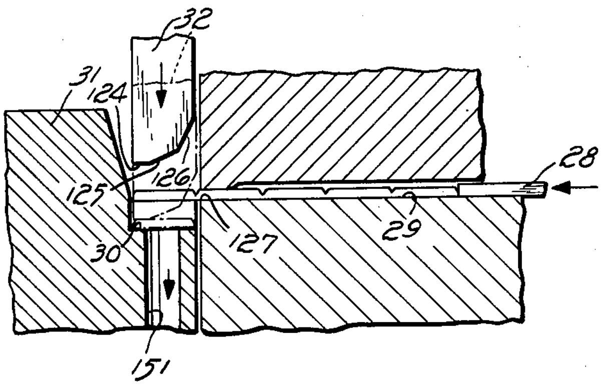
FIG. 12 is a fragmentary sectional view of the wafer breaking unit.

The wafer breaking unit 32 has a series of surfaces 124, 125 and 126 as shown in FIG. 12 aligned with a pocket 30 of the turret 31 at the receiving station for the wafers. The guideway 29 has an edge 127 cooperating with the breaking unit 32 so that when the breaking unit is moved from its solid line or up position FIG. 12 to its broken line or operated position, it will cooperate with the breaking unit in breaking the leading wafer from the strip. The breaking unit 32 is shown in detail in FIG. 11, it being supported in a holder 130 and extending over a portion of the turret 31 as illustrated also in FIG. 2. A bushing 131, adjustably mounted in the holder 130, is apertured to support an upper portion 132 of the unit for vertical movement and limit its stroke. The unit is held upwardly normally by a spring 133 to position a head 134 to be engaged by an actuator 135. The actuator 135, FIGS. 1 and 2, is carried by an arm 136 of the cradle 137 supported for pivotal and longitudinal movement on a spindle 138, the ends of which are mounted in brackets 139 mounted on the base 35. The cradle 137 is actually given rocking movements at first and second positions, but it is only during one of these rocking movements that the actuator 135 is positioned to engage the head 134 and actuate the wafer breaking unit 32. A transfer unit 140 is supported by an arm 141 of the cradle 137 and has a transfer element such as a suction needle 142 connected to a suction line 143 and adapted to pick-up accepted wafers from successive pockets 30 of the turret 31 and deposit them in nests 144 of a wafer tray 145. The turret 31, as illustrated in FIG. 9, has four pockets 30 and is driven intermittently to position these pockets respectively in a load station 146, a test station 147, an unload station 148 and reject station 149. The load station 146 is identical with the wafer breaking station for it is here that the successive wafers are broken and deposited in the pockets 30 of the turret 31. At the test station, commercial unit 150 FIG. 3, known as an optical comparator, is utilized in determining whether or not the wafers are acceptable. If a wafer at the test station 147 is not acceptable then means (not shown) is actuated to cut off suction through line 143 to the needle 142 and to render inoperative the advancing means for the tray 145 so that the rejected wafer will remain in the pocket 30 until it reaches the reject station 149. As shown in FIG. 12, a passageway 151 is in communication with each pocket 30 of the turret 31. Means is connected to these pockets through the passageways 151 at some of the stations to retain the wafers against displacement in the pockets. However, at the reject station these passageways 151 are connected successively to suitable means to force air under pressure therethrough to force any rejected wafer remaining therein out of the pockets together with any foreign matter which may be present in the pockets. Also, at the unload station the suction is cut off if the wafer therein is accepted.

Figure 13:
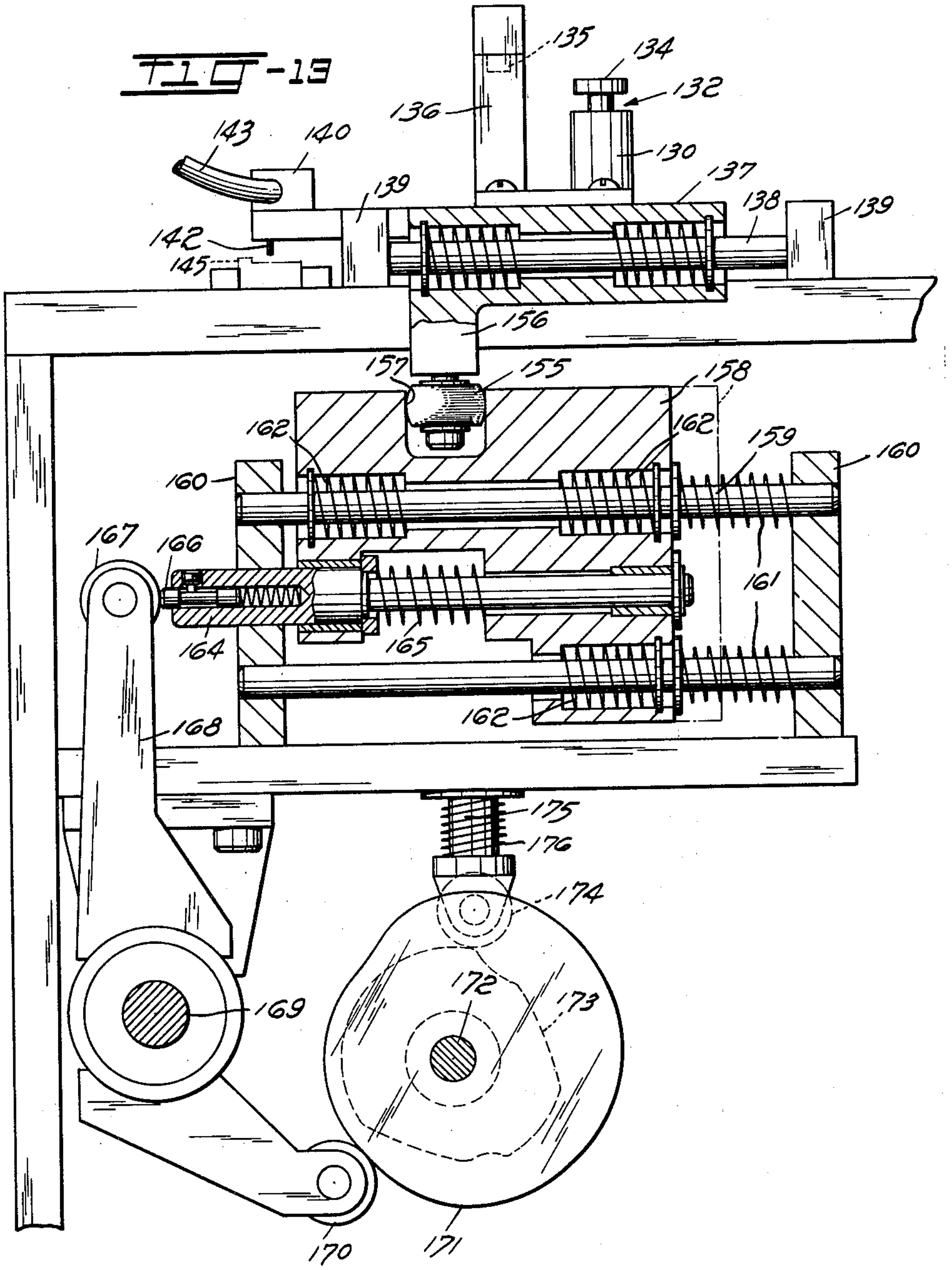
FIGS. 13 and 14 are vertical sectional views of the wafer breaking means and transfer unit.

The cradle 137 is supported on the spindle 138 for longitudinal, as well as, for rocking movement. The longitudinal movement is between first and second rocking positions. At the first position, the actuator 135 is located to engage the head 134 of the wafer breaking unit 32, and at the same time, the suction needle 142 of the transfer unit 140 is positioned to engage a wafer at the station 148 FIG. 9. While at this position, the cradle will be rocked from its up position to its down position to bring about these actions, that is, operation of the wafer breaking unit 32 and picking up of the wafer at station 148. The second position of the cradle locates the actuator 135 out of alignment with the head 134 of the wafer breaking unit 32 as shown in FIG. 13 and aligns the suction needle 142, holding the wafer removed from the pocket 30 at station 148, in alignment with a nest 144 of the tray 145. At this time, suction is released and if necessary, air applied to cause the needle 142 to release the wafer and allowing it to drop into the adjacent nest 144 of the tray 145.

The means for imparting longitudinal movement to the cradle 137 is shown in FIG. 13. A roller 155 carried by a projection 156 of the cradle rides in a groove 157 of a carriage 158, which is supported by parallel rods 159, the ends of which are mounted in apertures of vertical members 160. The carriage 158 normally is urged to the left by springs 161 disposed concentric with the rods 159 and is provided with cushioning springs 162 housed in the carriage 158. A push rod 164 movable axially in the carriage 158 extends through an aperture in the adjacent vertical member 160 and is urged to the left by a spring 165. A spring-pressed plunger 166, disposed in an apertured end of the push rod 164, is positioned to be engaged by a roller 167 of one end of a cam lever 168. One end of the cam lever 168 is pivotally mounted at 169, the other end carrying a roller or cam follower 170 urged by the spring 165 and the spring-pressed plunger 166 to ride on a cam 171, which is mounted on cam shaft 172.

Figure 14:
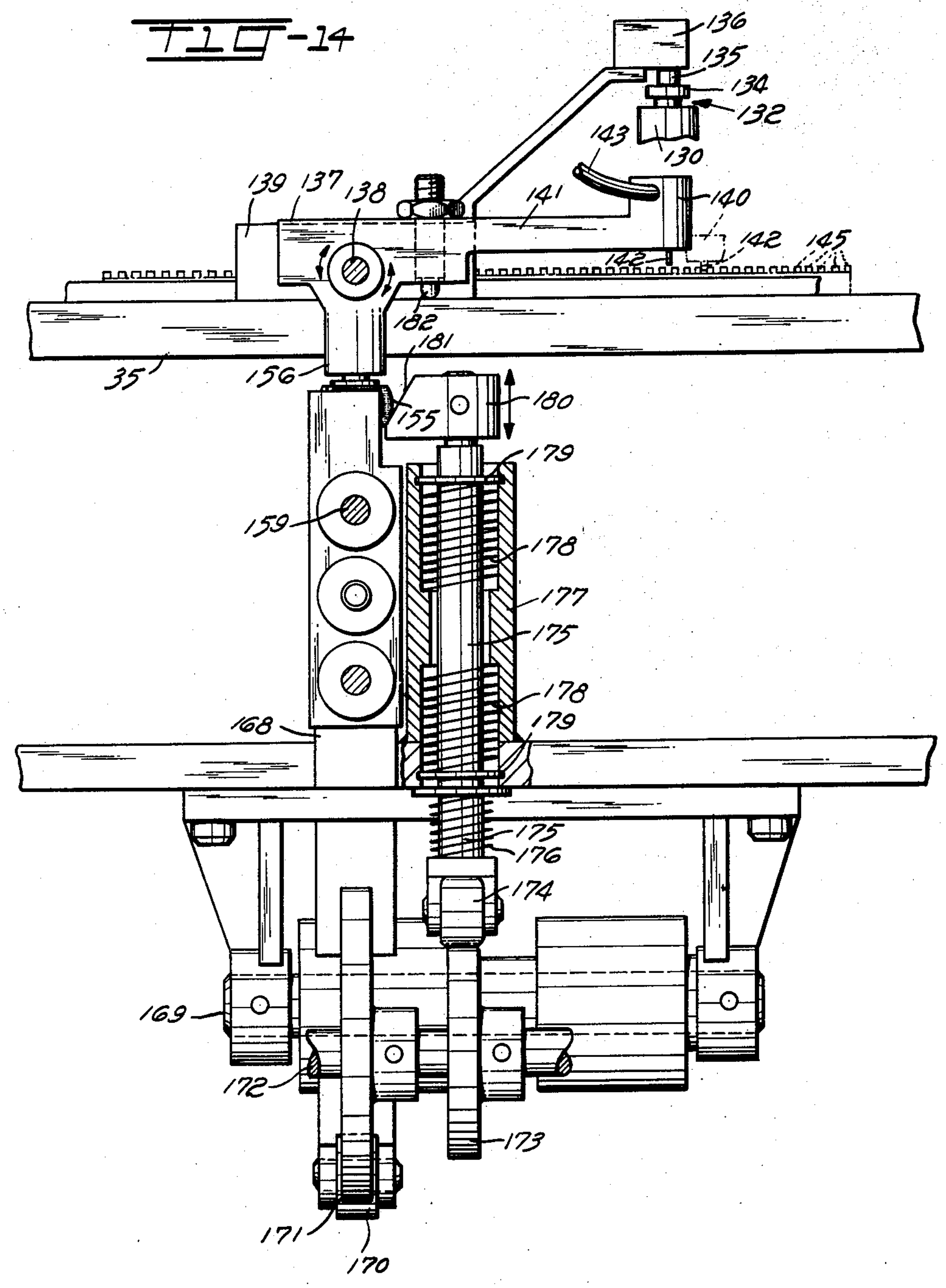

The means to impart rocking movements to the cradle 137 originates with a cam 173 mounted on the cam shaft 172 and engaged by a cam follower 174 mounted on the lower end of a rod 175. A spring 176 urges the rod 175 downwardly to cause the cam follower 174 to ride on the periphery of the cam 173, the rod extending through a stationary housing 177 in which cushioning springs 178 are disposed tending to provide balancing forces applied to the rod through the aid of collars 179. A cam-like actuator 180 is mounted on the upper end of the rod 175 and has a tapered surface 181 disposed in engagement with the roller 155 to thereby bring about rocking movements to the cradle 137. An adjustable stop 182 terminates the rocking movements in the operated positions of the cradle as illustrated in FIG. 14.

*Operation*

After a slice of scribed semiconductor material has been placed in the nest 21 and the member 22 disposed in place the apparatus may be set in operation. The various controls have not been described in detail, but it should be understood that with the slice 20 scribed to produce twenty-two wafers in each strip 25 then after each operation of the strip breaking unit 27 there will follow twenty-two successive operations for the processing of the individual wafers. Variations of these selections are within the discretion of the operator.

Figure 4:
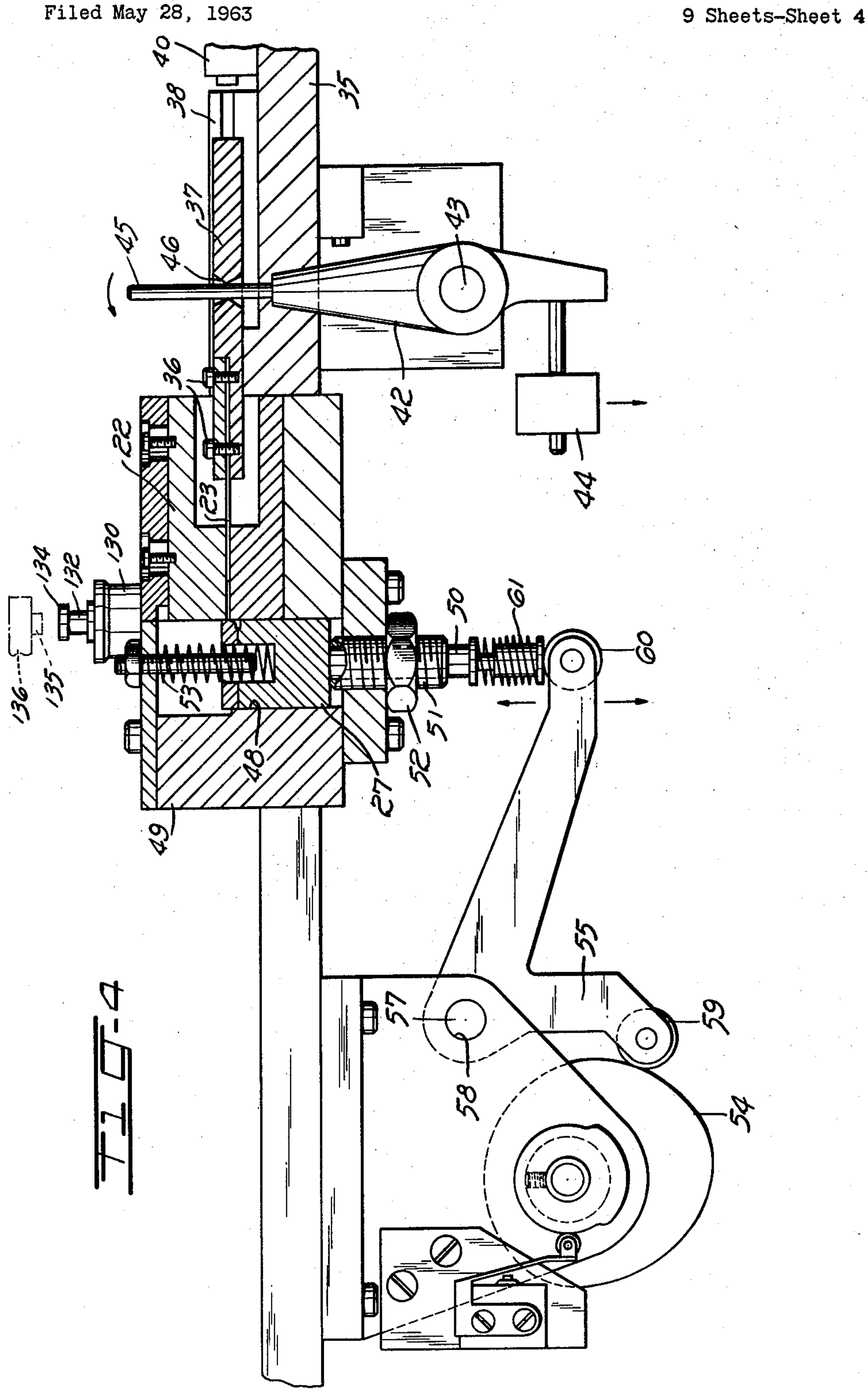
FIG. 4 is a vertical sectional view of the feeding means for the scribed slice of semiconductor material.
Figure 5:
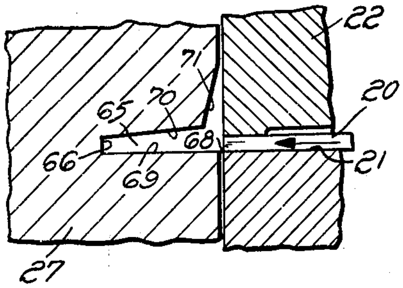
FIGS. 5, 6, 7 and 8 are fragmentary vertical sectional views of the strip breaking unit illustrating progressive steps in the operation thereof.
Figure 6:
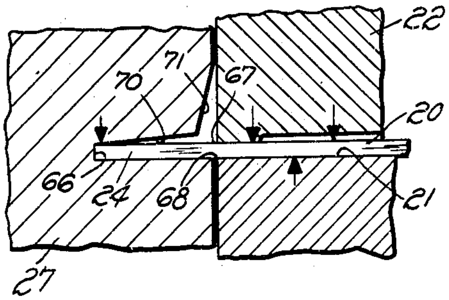
Figure 7:
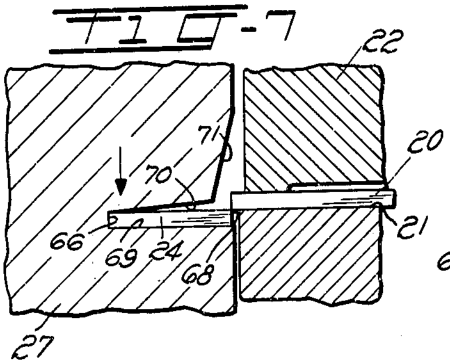
Figure 8:
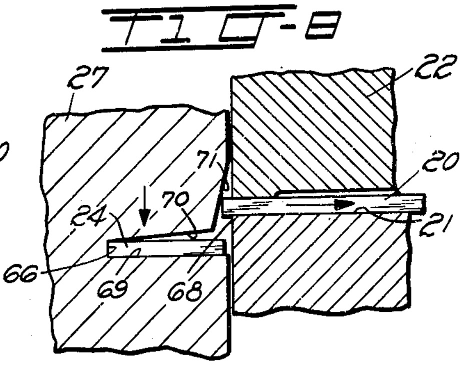

As illustrated in FIG. 4, the slice 20 is advanced by gravity in the nest 21 toward the strip breaking unit 27. This gravity feed is brought about through the force of the weight 44 FIG. 4 on the lever 42. In the present instance, the forward advancement of the slice is controlled by the mouth 65 of the strip breaking unit 27 FIGS. 5 to 8 inclusive, but it may be controlled by a feeding means similar to that which feeds the strip. With this structure, the slice is advanced into the mouth 65 as shown in FIGS. 5 and 6 until the leading edge of the slice engages the surface 66 at which time the scribed line 67 is in a plane with the breaking edge 68 of the nest 21 so that during the action as illustrated in FIG. 4 of the strip breaking unit 27, the strip is broken from the slice and is held in the position shown in FIG. 8. The strip breaking unit remains in this position locating the strip in alignment with the pusher 28 and the guideway 29 FIG. 3 so that during the next twenty-two successive operations of the strip feeding unit shown in FIGS. 1, 2, 10 and 11, the strip is advanced to the wafer breaking unit 32 FIGS. 11 and 12. At this time, through the alternate function of the spring 104 FIG. 1 and the solenoid 106, the carriage 102 is reciprocated to cause the actuators 92 and 93 to move alternately into supporting position with respect to the projections 88 and 89 of the positioning unit 87 to successively lower the stop 85 relative to the steps 84 of the measuring unit 76 to free the measuring unit for advancement by action of the weighted lever 114 FIG. 11 to cause the pusher 28 to move the strip 24 a measured distance namely, the length of each wafer 25 in the strip. At the end of each advancement of the strip, the cradle 137 FIGS. 1, 13 and 14 is rocked to cause the actuator 135 to operate the wafer breaking unit 32 at the loading station 146 and at the same time cause the suction needle 142 of the transfer unit 140 to operate to pick up a wafer from the pocket 30 of the turret 31 at station 148 if this wafer has passed the test at station 147. If the wafer is to be rejected as a result of the test at station 147, the operator may operate a reject switch to render the suction means for the needle 142 ineffective and the advancing means for the tray 145 unoperative, or if desired this may be carried out automatically by suitable means not shown. These operations regarding the feeding of the strip, the breaking of the wafers therefrom successively, the testing of the wafers at station 147 and the operation of the cradle 137 to bring about this function as well as the removal of the wafers from station 148 if they have passed the test, continues until all of the wafers in that strip have been processed. All wafers failing the test at station 147 will continue on to station 149 where they will be forced from the pocket 30 by air under pressure through the passageway 151. When this series of operations have been completed, cams 100 and 120 on cam shaft 121 of the structure as shown in FIG. 11 will return the positioning unit 87 and the measuring element 76 to their starting positions after the solenoid 111 FIG. 1 has been energized to move the carriage 102 laterally to move the actuators 92 and 93 out of registration with the projections 88 and 89 of the positioning unit 87. Furthermore, the strip breaking unit 27 is moved through another cycle of operation to break another strip 24 from the slice 20 and position it to assist in its advancement through the next 22 operating cycles of the strip feeding means, the wafer breaking unit, and the other operating functions associated therewith. In this manner, the very small wafers may be removed efficiently and accurately from the scribed slice of semiconductor material tested and placed in their respective nests in the tray 145 without disturbing the orientation of the wafers and without the necessity of handling the wafers individually.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for removing wafers from semiconductor slices scribed with a plurality of connected strips each having a plurality of connected wafers comprising:
   - a unit operable to break the strips successively from a slice,
   - means to feed the slice at predetermined intervals to the unit,
   - a unit operable to break the wafers successively from the successive strips,
   - means operable to feed each strip in successive steps to the wafer breaking unit, a nest for the successive slices disposed adjacent the strip breaking unit and having an edge cooperating therewith to break the strips successively from the slice, and a mouth in the strip breaking unit adapted to receive a leading strip of the slice and having surfaces cooperating to support the leading strip, locate its line of juncture with the next strip parallel with said edge of the nest and cause movement of the leading strip relative to the slice to break it from the slice when the unit is moved.

2. An apparatus for removing wafers from semiconductor slices according to claim 1 in which:

the strip feeding means includes a measuring element with steps equal in depth to the lengths of the wafers in each strip to thereby measure the feeding movements of the strip to the wafer breaking unit, a pusher fixed at one end to the measuring element and having its other end positioned to engage a trailing end of the strip, and a stop movable to be engaged by the steps of the measuring element in successive order to advance the wafers of the strip in successive order to the wafer breaking unit.

3. An apparatus for removing wafers from semiconductor slices according to claim 1 in which:

the strip feeding means includes a measuring element with steps equal in depth to the lengths of the wafers in each strip to thereby measure the feeding movements of the strip to the wafer breaking unit, a pusher fixed at one end to the measuring element and having its other end positioned to engage a trailing end of the strip, means to apply a constant moving force to the measuring element to move the pusher and strip, a stop movable to be engaged by the successive steps of the measuring element to control movements thereof, a support for the stop, and means operable to move the support to locate the stop for engagement of the successive steps of the measuring element therewith.

4. An apparatus for removing wafers from semiconductor slices according to claim 1 in which:

the strip feeding means includes a measuring element with steps equal in depth to the lengths of the wafers in each strip to thereby measure the feeding movements of the strip to the wafer breaking unit, a pusher fixed at one end to the measuring element and having its other end positioned to engage a trailing end of the strip, means to apply a constant moving force to the measuring element to move the pusher and strip, a stop movable to be engaged by the successive steps of the measuring element to control movements thereof, a support for the stop adapted for movement relative to the measuring element, projections of the support disposed in planes spaced distances apart corresponding to the spacing of the steps of the measuring element, and means adapted to engage the projections successively to free the support to move the stop for registration with the steps of the measuring element successively.

5. An apparatus for removing wafers from semiconductor slices according to claim 1 in which:

a turret having pockets disposed at spaced positions adjacent its periphery is mounted for intermittent rotation adjacent the wafer breaking unit to locate the pockets during intervals of rest to receive the wafers successively, and means to operate the wafer breaking unit to break the wafers successively and cause them to lie in the successive pockets of the turret.

6. An apparatus for removing wafers from semiconductor slices according to claim 1 in which:

a turret having pockets disposed at spaced positions adjacent its periphery is mounted for intermittent rotation adjacent the wafer breaking unit to locate the pockets during intervals of rest to receive the wafers successively, a test station disposed adjacent the turret, a reject station disposed adjacent the turret at a position spaced from the test station, means at the test station to test the wafers in the successive pockets, and means at the reject station to force all reject wafers from the pockets.

7. An apparatus for removing wafers from semiconductor slices according to claim 1 in which:

a turret having pockets disposed at spaced positions adjacent its periphery is mounted for intermittent rotation adjacent the wafer breaking unit to locate the pockets during intervals of rest to receive the wafers successively, an unloading station for the turret, a tray having nests for the wafers movable relative to the unloading station to successively locate nests at said station, a cradle supported for movement, a transfer element mounted on the cradle, an actuator for the wafer breaking unit mounted on the cradle, and means to move the cradle to cause the actuator to operate the wafer breaking unit to thereby break a wafer and locate it in one pocket of the turret and to cause the transfer element to pick a wafer from another pocket of the turret.

8. An apparatus for removing wafers from semiconductor slices according to claim 1 in which:

a turret having pockets disposed at spaced positions adjacent its periphery is mounted for intermittent rotation adjacent the wafer breaking unit to locate the pockets during intervals of rest to receive the wafers successively, an unloading station for the turret, a tray having nests for the wafers movable relative to the unloading station to successively locate nests at said station, a cradle supported for movement, a transfer element mounted on the cradle, an actuator for the wafer breaking unit mounted on the cradle, means operable to impart rocking movements to the cradle at first and second positions so that at the first position the actuator will operate the wafer breaking unit to break a wafer from the strip and cause it to lie in the adjacent pocket and the transfer element will be lowered to remove a wafer from the pocket at the unload station, and means interposed between the wafer breaking unit and the unloading station to test the wafers, the transfer element being rendered ineffective to remove any rejected wafers from the pockets.

9. An apparatus for removing wafers from semiconductor slices according to claim 1 in which:

a turret having pockets disposed at spaced positions adjacent its periphery is mounted for intermittent rotation adjacent the wafer breaking unit to locate the pockets during intervals of rest to receive the wafers successively, an unloading station for the turret, a tray having nests for the wafers movable relative to the unloading station to successively locate nests at said station, a cradle supported for movement, a transfer element mounted on the cradle, an actuator for the wafer breaking unit mounted on the cradle, means operable to impart rocking movements to the cradle at first and second positions so that at the first position the actuator will operate the wafer breaking unit to break a wafer from the strip and cause it to lie in the adjacent pocket and the transfer element will be lowered to remove a wafer from the pocket at the unload station, and means to move the cradle between its first and second rocking positions.

References Cited in the file of this patent

UNITED STATES PATENTS

| | | |
|---|---|---|
| 2,778,926 | Schneider | Jan. 22, 1957 |
| 2,948,991 | Walters et al. | Aug. 16, 1960 |
| 2,970,730 | Schwarz | Feb. 7, 1961 |
| 3,040,489 | Da Costa | June 26, 1962 |
| 3,044,216 | Billinger | July 17, 1962 |
| 3,061,739 | Stone | Oct. 30, 1962 |

FOREIGN PATENTS

| | | |
|---|---|---|
| 1,236,148 | France | June 7, 1960 |